United States Patent
Rajagopal

(10) Patent No.: US 11,694,552 B2
(45) Date of Patent: Jul. 4, 2023

(54) TRAFFIC WARNING AND DATA CAPTURE DEVICES AND METHODS

(71) Applicant: Arudi Srinivas Rajagopal, Cincinnati, OH (US)

(72) Inventor: Arudi Srinivas Rajagopal, Cincinnati, OH (US)

(*) Notice: Subject to any disclaimer, the term of this patent is extended or adjusted under 35 U.S.C. 154(b) by 0 days.

(21) Appl. No.: 17/210,704

(22) Filed: Mar. 24, 2021

(65) Prior Publication Data

US 2021/0304610 A1    Sep. 30, 2021

Related U.S. Application Data

(60) Provisional application No. 62/993,968, filed on Mar. 24, 2020.

(51) Int. Cl.
G08G 1/16        (2006.01)
G08G 1/01        (2006.01)

(52) U.S. Cl.
CPC .......... *G08G 1/164* (2013.01); *G08G 1/0133* (2013.01)

(58) Field of Classification Search
None
See application file for complete search history.

(56) References Cited

U.S. PATENT DOCUMENTS

| | | | |
|---|---|---|---|
| 5,935,190 A * | 8/1999 | Davis | G08G 1/054 340/936 |
| 6,522,263 B2 * | 2/2003 | Jones | G08G 1/0955 340/471 |
| 7,357,527 B2 * | 4/2008 | Meyers | G09F 13/02 362/183 |
| 7,937,868 B2 * | 5/2011 | Gallet | G09F 13/16 40/443 |
| 8,141,306 B2 * | 3/2012 | Masuda | F24S 25/632 126/621 |
| 8,880,237 B2 * | 11/2014 | Boss | G08G 1/096716 701/1 |
| 9,235,988 B2 * | 1/2016 | Mimeault | G08G 1/015 |
| 9,984,569 B1 * | 5/2018 | Howell | G08G 1/0116 |
| 10,332,401 B2 * | 6/2019 | Zruya | G08G 1/164 |
| 10,488,492 B2 * | 11/2019 | Hamel | G01S 7/487 |
| 10,885,780 B1 * | 1/2021 | Bseileh | G08G 1/087 |
| 10,937,309 B2 * | 3/2021 | Lamoncha | G08G 1/04 |
| 11,273,808 B2 * | 3/2022 | Meyer | B60W 30/16 |
| 2002/0159245 A1 * | 10/2002 | Murasko | G09F 13/22 362/183 |

(Continued)

*Primary Examiner* — Muhammad Adnan
(74) *Attorney, Agent, or Firm* — Schwegman Lundberg & Woessner, P.A.

(57) ABSTRACT

Aspects of traffic warning and data capture are discussed. An indication of an approaching vehicle and an ambient light level are received by a device associated with a signboard. Based on the indication and the ambient light level, an alert is provided to a driver of the approaching vehicle. For providing the alert, a first illumination panel positioned to direct light onto a face of signboard is lighted. In various embodiments, lights in different colors are flashed for alerting a driver of the approaching vehicle of different hazardous driving conditions, wherein the lights of different colors are flashed at different instances and in one more directions. Further, the device can record and store or share traffic and pedestrian movement information for further analysis.

19 Claims, 9 Drawing Sheets

(56) References Cited

U.S. PATENT DOCUMENTS

| | | | |
|---|---|---|---|
| 2003/0081934 A1* | 5/2003 | Kirmuss | B60R 11/02 348/E7.086 |
| 2004/0183694 A1* | 9/2004 | Bauer | G08G 1/095 340/933 |
| 2006/0274166 A1* | 12/2006 | Lee | H04N 5/765 386/E5.002 |
| 2007/0002561 A1* | 1/2007 | Tesmer | F24S 30/48 362/276 |
| 2007/0159836 A1* | 7/2007 | Huang | F21S 8/086 362/411 |
| 2007/0290886 A1* | 12/2007 | Stam | G08G 1/052 340/907 |
| 2008/0068218 A1* | 3/2008 | Lawson | G08G 1/096783 340/905 |
| 2009/0174542 A1* | 7/2009 | Gentry | G08B 7/066 362/249.02 |
| 2009/0237271 A1* | 9/2009 | Sundstrom | G08G 1/0955 340/936 |
| 2010/0073480 A1* | 3/2010 | Hoek | G01P 1/08 348/148 |
| 2010/0328933 A1* | 12/2010 | Maldonado | H05B 47/115 362/183 |
| 2011/0110521 A1* | 5/2011 | Yang | H04W 48/20 709/222 |
| 2011/0237254 A1* | 9/2011 | Lee | H04N 21/2665 455/435.2 |
| 2012/0206276 A1* | 8/2012 | Cai | F21S 9/037 340/907 |
| 2013/0181849 A1* | 7/2013 | Cai | G08G 1/09 340/905 |
| 2013/0281025 A1* | 10/2013 | Reunamaki | H04L 67/75 455/39 |
| 2014/0118553 A1* | 5/2014 | Diba | G08G 1/087 348/149 |
| 2014/0195068 A1* | 7/2014 | Boss | G08G 1/096775 701/1 |
| 2016/0042767 A1* | 2/2016 | Araya | H04N 7/188 386/201 |
| 2016/0373984 A1* | 12/2016 | Hara | H04W 36/0085 |
| 2018/0191403 A1* | 7/2018 | Pierson | H04B 7/0602 |
| 2018/0293922 A1* | 10/2018 | Rajagopal | H02S 40/38 |
| 2019/0035276 A1* | 1/2019 | Zruya | G08G 1/166 |
| 2019/0088121 A1* | 3/2019 | Linville | G08G 1/02 |
| 2019/0088148 A1* | 3/2019 | Jacobus | G08G 1/096716 |
| 2019/0172355 A1* | 6/2019 | Stock | B60W 30/14 |
| 2019/0197883 A1* | 6/2019 | Camras | G08G 1/005 |
| 2019/0283788 A1* | 9/2019 | Linville | B61L 29/284 |
| 2019/0325749 A1* | 10/2019 | Tu | G08G 1/146 |
| 2019/0385386 A1* | 12/2019 | Davidson | G07C 5/0858 |
| 2019/0385387 A1* | 12/2019 | Davidson | G07C 5/008 |
| 2019/0387379 A1* | 12/2019 | Sugiyama | H04L 5/0048 |
| 2021/0027621 A1* | 1/2021 | Bseileh | G08G 1/07 |
| 2021/0264824 A1* | 8/2021 | Schmidling | G09F 13/0413 |
| 2021/0274748 A1* | 9/2021 | Massie | A01K 3/001 |
| 2021/0302621 A1* | 9/2021 | Brown | G01W 1/10 |

* cited by examiner

TRAFFIC WARNING AND DATA CAPTURE DEVICES AND METHODS

CROSS-REFERENCE TO RELATED APPLICATIONS

This application claims the benefit of priority to U.S. Provisional Application No. 62/993,968, filed on Mar. 24, 2020, entitled "INTEGRATED TRAFFIC WARNING AND DATA CAPTURE," the benefit of priority of which is claimed herein, and which application is hereby incorporated herein by reference in its entirety.

TECHNICAL FIELD

The present subject matter relates in general to traffic warning and data capture and, in particular, to integrated traffic warning and data capture devices that are mountable on signposts and methods performed by the integrated traffic warning and data capture devices.

BACKGROUND

Intersections on roads may be signalized or unsignalized. Signalized intersections are the ones with traffic lights to guide vehicle movement and unsignalized intersections are the ones where there are no traffic lights and vehicle movement is expected to be self-regulated by drivers following traffic rules. At some unsignalized intersections, a traffic signboard, such as a stop signboard or speed limit signboard, may be installed to let a driver of the vehicle know about the unsignalized intersections and to facilitate regulation of the traffic. Further, traffic signboards may be placed along the roadway to alert drivers about unsafe road conditions.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

The present subject matter provides integrated traffic warning and data capture (TWDC) devices for signboards and method of alerting drivers using the integrated traffic warning and data capture devices. Although the example implementations of the present application have been discussed with respect to traffic signboards in the following description, it will be understood that the methods and devices may be used for alerting drivers of approaching vehicles about any signboard, including advertisement signboards, public message signboards, and the like.

Figure 1A:
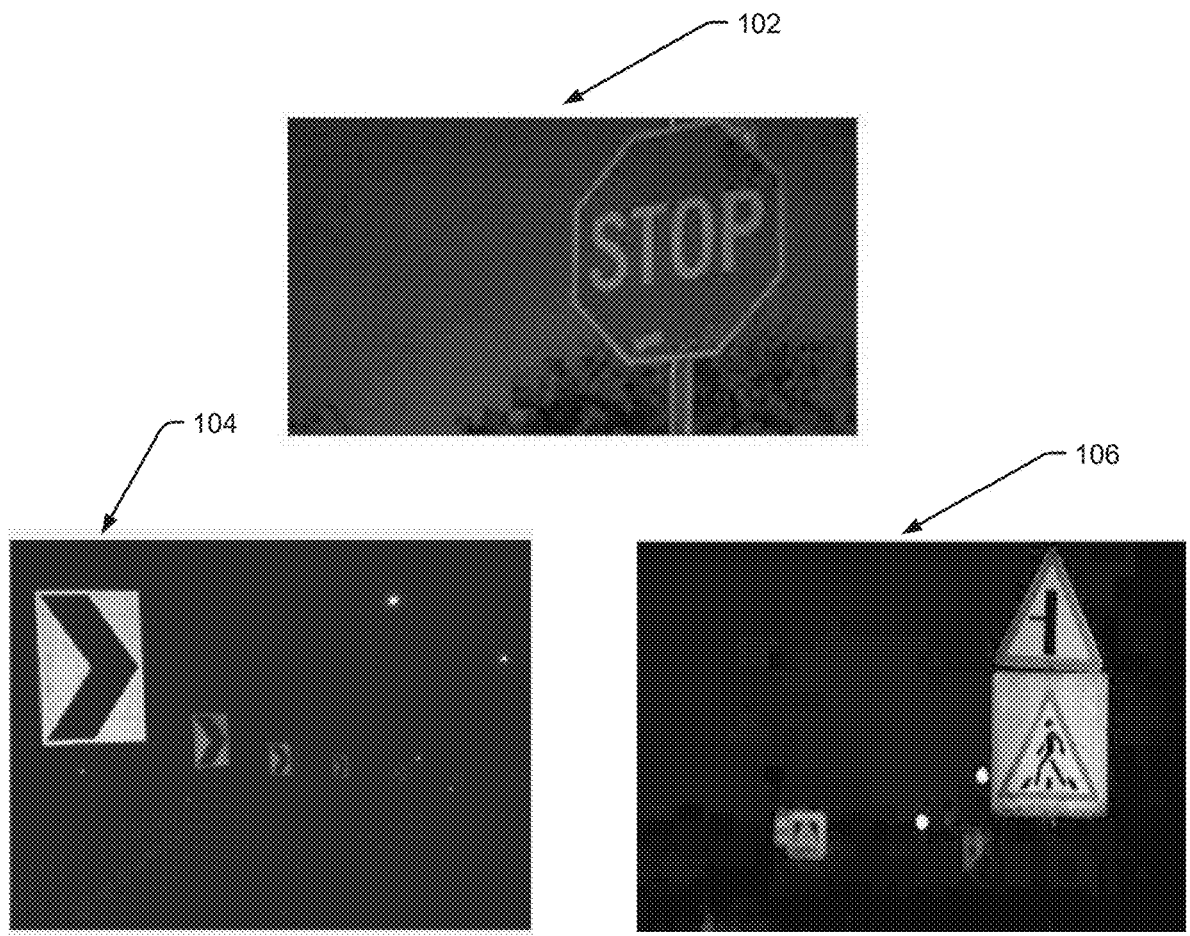
FIG. 1a depicts images of conventional traffic signboards during low visibility conditions.

Traffic signboards may be placed at signalized intersections, unsignalized intersections, and along the roadway to alert drivers about unsafe conditions. FIG. 1a depicts images of conventional traffic signboards during low visibility conditions. A stop signboard is shown in image 102, a chevron alignment signboard is shown in image 104, and a pedestrian crossing signboard is shown in image 106. At times, due to low visibility conditions, such as bad weather conditions or night time conditions, the traffic signboards may not be easily visible to drivers, resulting in accidents or traffic backups. Hence, in some instances, the traffic signboard may be lighted, for example, by light bulbs that are integrated with the traffic signboard.

Figure 1B:
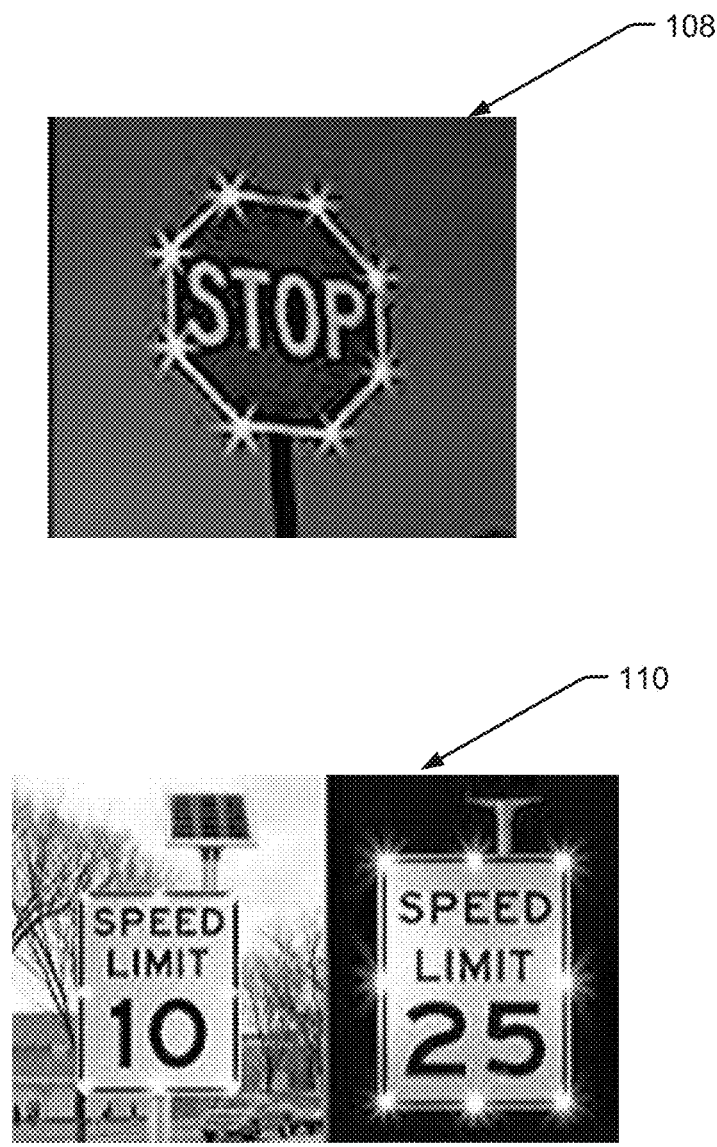
FIG. 1b depicts images of a conventional illuminated traffic signboard as known in the art.

FIG. 1b depicts images of illuminated traffic signboards as known in the art. An illuminated stop signboard is shown in image 108 and an illuminated speed limit signboard is shown in image 110. Though the illuminated traffic signboards may have adequate visibility during low visibility conditions, the illuminated traffic signboards are always custom made by integrating the light bulbs with the traffic signboards. Hence, the non-lighted signboards have to be completely replaced with the illuminated ones, which may be time-consuming and would increase the cost. Typically, as shown in the FIG. 1b, the light bulbs are present at the perimeter of the illuminated signboards and hence, the placement of such light bulbs draws the attention of drivers and can be a distraction to the drivers. Further, the series of light bulbs present at the perimeter of the illuminated signboard projects bright light towards the traffic causing a glare in the vision of drivers and leading to unsafe driving conditions.

Figure 2:
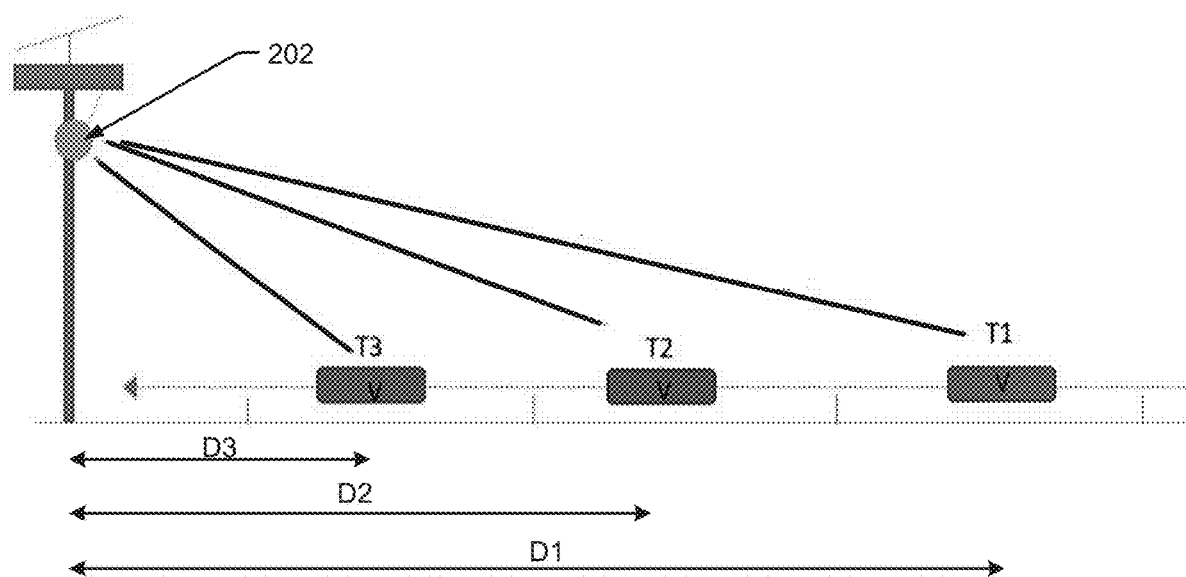
FIG. 2 illustrates a range of distances over which conventional traffic signboards are visible or barely visible to drivers of vehicles.

FIG. 2 illustrates a range of distances over which conventional traffic signboards are visible or barely visible to drivers of vehicles. As shown in FIG. 2, at time T1, a vehicle V may be at a distance D1 from a traffic signboard 202. In an example, the traffic signboard 202 may be a stop signboard. In an example, the traffic signboard 202, at time T1, may be in a range of distance from where the signboard 202 is barely visible or not visible to the driver of the vehicle V during low light conditions. At time T2, the vehicle V moves towards the traffic signboard 202 and is at a distance D2 from the traffic signboard 202, however, still the traffic signboard 202 may be in a range of distance of low visibility for the driver of the vehicle. Further, at time T3, the vehicle V moves closer to the traffic signboard 202 and is at a distance D3 from the traffic signboard 202. The traffic signboard may now be in a range of distance of clear visibility for the driver of the vehicle. However, by the time the traffic signboard 202, such as the stop signboard is visible to the driver of the vehicle, the distance between the vehicle and the traffic signboard may be very small and an average approach speed may be higher than what is normally desired to bring the vehicle to a normal stop at the traffic signboard. In such cases, hard braking and last-minute manoeuvring may be resorted to, which may be risky.

The present subject matter provides traffic warning and data capture (TWDC) devices for signboards, such as traffic signboards. For ease of discussion, the TWDC devices are interchangeably referred to as devices hereinafter. An example device includes a power system including a power source (such as a solar panel), a housing, a memory, a processor, an input/output (I/O) interface, one or more illumination panels, and one or more sensing devices. In one example, the processor receives an indication of an approaching vehicle from a traffic sensor and an ambient light level. The ambient light level may be received from the solar panel or a light sensor. Based on the indication and the ambient light level, the processor causes an alert to be provided to a driver of the approaching vehicle by lighting a first illumination panel positioned to direct light of a first color onto a face of the signboard.

In various examples, the sensing devices may include devices such as ambient light sensors, temperature sensors, speed sensors, movement detectors, video camera, and the like, which may be used for detecting various hazardous driving conditions and accordingly, the one or more illumination panels may cause lights in different colors to be flashed for alerting a driver of an approaching vehicle of the different hazardous driving conditions. The lights of different colors may be flashed at different instances and in one more directions, such as on the face of the signboard, in the direction of approaching traffic, in the direction of a traffic crossing, and the like.

In an example, the sensing devices may include a traffic detector, such as a radar traffic detector or a Lidar traffic detector, to detect traffic pattern, such as average speed of the vehicle, density of traffic, etc. The density of traffic may be the number of vehicles passing through the area covered by the device during an interval of time. The traffic detector can also act as the speed sensor to monitor the speed of oncoming vehicles. In an example, the long-range movement detectors can also trip a warning to a traffic management center in case of over speeding vehicles at the intersections. In another example, a short-range movement detector may be used in traffic detectors to trip the camera for low-power-consumption still shots.

Further, the device may collect various parameters, such as temperature, traffic pattern, and pedestrian activity, over time and this may be used for further analysis to provide enhanced safety measures on the roadway. The traffic pattern may include, for example, traffic density and average speed, among other parameters.

The present subject matter, therefore, integrates various components into a single TWDC device that helps in enhancing the visibility of traffic signboards during low visibility conditions by illuminating LED light on the traffic signboards. The integrated device also helps in alerting drivers about various driving conditions, such as temperature-related dangerous road conditions that can lead to the formation of ice or snow on roads, pedestrian activity at the pedestrian walk zone, etc., by flashing different colored lights. The present subject matter also monitors the real-time traffic pattern that helps traffic engineers improve roadway geometrics. Thus, the present subject matter can help to improve overall road safety.

The above and other features, aspects, and advantages of the subject matter will be better explained with regard to the following description and accompanying figures. It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present disclosure. Moreover, all statements herein reciting principles, aspects, and examples thereof, are intended to encompass equivalents thereof. Further, for the sake of simplicity, and without limitation, the same numbers are used throughout the drawings to reference like features and components.

Figure 3A:
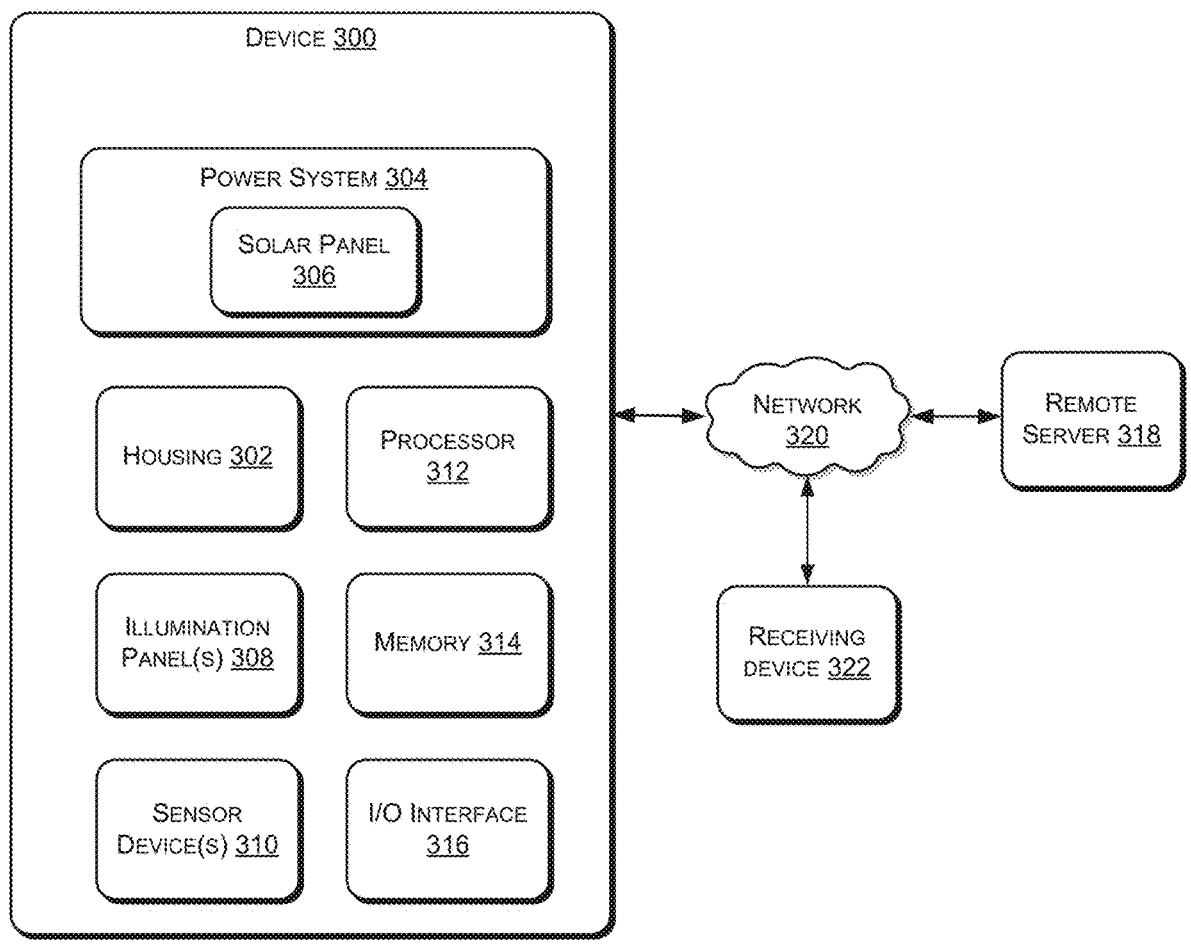
FIG. 3a illustrates a block diagram of a traffic warning and data capture (TWDC) device, in accordance with an example implementation of the present subject matter.
Figure 3B:
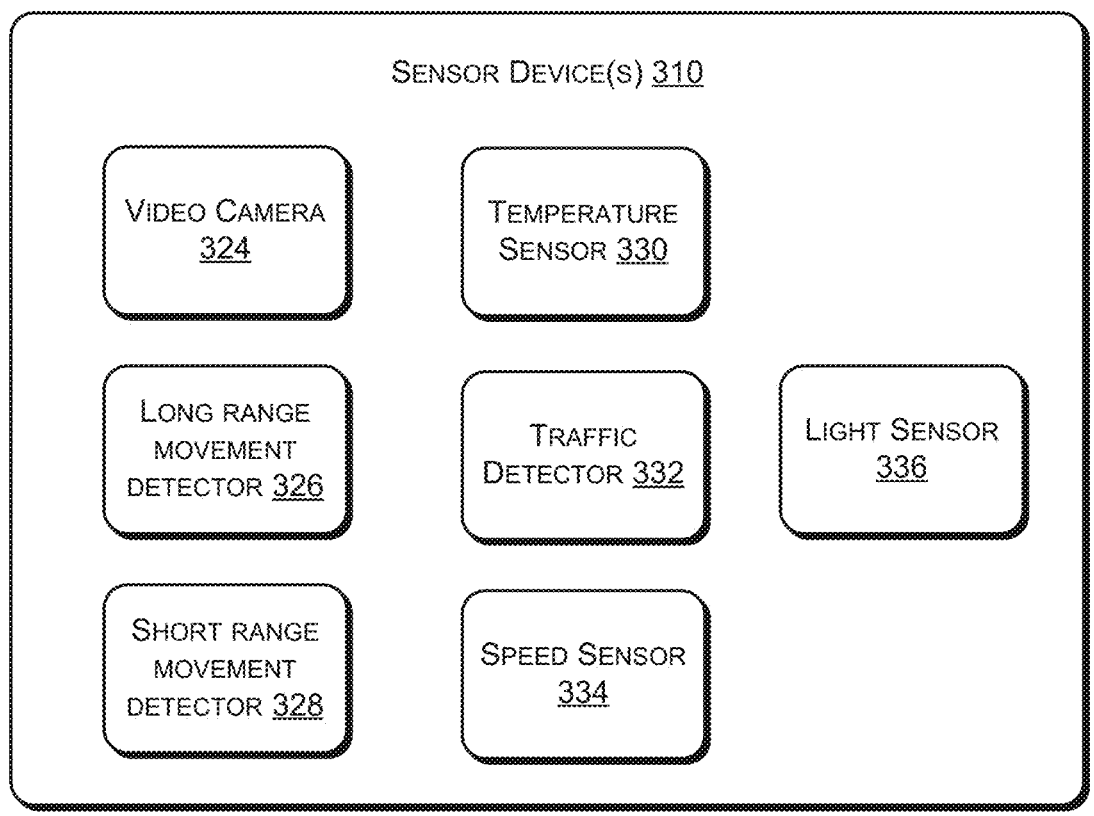
FIG. 3b illustrates example sensing devices, in accordance with an example implementation of the present subject matter.

FIG. 3a illustrates a block diagram of a TWDC device, in accordance with an example implementation of the present subject matter. FIG. 3b illustrates a block diagram including example sensing devices, in accordance with an example implementation of the present subject matter. In an example, the TWDC device 300, also referred to as device 300 may be mounted on an existing traffic signpost using a universal mounting bracket. FIGS. 3a and 3b are discussed together below.

The device 300 includes a housing 302 to be mounted on the signpost having a signboard mounted thereon, a power system 304 comprising a power source mounted on the housing 302 to generate electricity for operation of the device 300, one or more illumination panels 308 mounted on the housing 302 to direct light in particular directions, and one or more sensing devices 310 attached to the housing 302. In one example, the power source may be a solar panel powered battery. In other examples, other power sources may be used, for example, to power light sources of higher luminescence. The description is provided with reference to the power source being a solar panel powered battery as an example embodiment and without limitation. Hence, the power source may be interchangeably referred to as solar panel 306. Further, the housing 302 houses various hardware components, such as a processor 312, a memory 314, and input/output interfaces 316. The processor 312 may be electrically connected to the power system 304, the one more illumination panels 308, and the one or more sensing devices 310.

As mentioned above, the power system 304 may also include a battery that may be charged by the solar panel 306 and the battery may in turn supply power to the various hardware components of the device 300. In one example, the various hardware components of the device 300 may be connected to a printed circuit board (PCB), which is housed in the housing 302.

The one or more illumination panels 308 may each include one or more light sources, such as light emitting diodes (LEDs), to provide light of a particular color. Further, the illumination panels 308 may be mounted such that they may face particular directions depending on the type of alert to be provided, as will be explained later.

The sensing devices 310 may include one or more of a video camera 324, a long-range movement detector 326 such as RADAR or LIDAR, and a short-range movement detector 328 such as simplified RADAR, simplified LIDAR, or ultrasonic sensors. The sensing devices 310 may also include one or more of a temperature sensor 330, a traffic detector 332, a speed detector 334, a light sensor 336, and the like.

The processor 312 may be implemented as one or more of microprocessors, microcomputers, microcontrollers, digital signal processors, central processing units, state machines, logic circuitries, and/or any devices that manipulate signals based on operational instructions. Among other capabilities, the processor 312 may fetch and execute computer-readable instructions. The functions of the processor 312 may be provided through the use of dedicated hardware as well as hardware capable of executing machine readable instructions.

The memory 314 may include any non-transitory computer-readable medium including volatile memory (e.g., RAM), and/or non-volatile memory (e.g., EPROM, flash memory, Memristor, etc.). The memory 314 may also be an external memory unit, such as a flash drive, a compact disk drive, an external hard disk drive, a database, or the like. In an example, the memory 314 is coupled to the processor 312 and the processor 312 may execute instructions stored in the memory 314 for the operation of the device 300.

The I/O interface(s) 316 may include a variety of hardware interfaces and machine-readable instructions-based interfaces that allow interaction with a user and with other communication and computing devices, such as wireless receiving devices, network entities, web servers, networked computing devices, external repositories, and peripheral devices. In an example, the I/O interface 316 can be used to stream data to a remote server or send notifications to a receiving device. The steaming can be accomplished by wired (LAN, ethernet) or wireless approach depending on information and its rate, for example, using various protocols such as Wi-Fi, LoRa, LTE, cellular, satellite, etc.

In operation, the processor 312 may cause an alert to be provided to a driver of an approaching vehicle when the ambient light level is less than a threshold light level or when the approaching vehicle is detected or both. In one example, the processor 312 may detect low light conditions based on light incident on the solar panel 306 or measured by an ambient light sensor. For example, the solar panel 306 may record a voltage that may vary depending on the amount of light incident on the solar panel 306 and may hence be used to detect low light conditions. During the day time, the solar panel 306 may receive sunlight which is used for charging the battery. Further, the voltage output of the solar panel 306 may be continuously recorded to measure the ambient light level and may be compared with a threshold voltage level corresponding to a threshold light level.

If the voltage output is found to be less than the threshold voltage level, the processor 312 may cause the light source of a first illumination panel to illuminate the traffic signboard so that drivers can clearly view the instructions on the traffic signboard. In an example, the light source of the first illumination panel may flash a white light on the traffic signboard during low visibility conditions at a periodic frequency or interval. In an example, the periodic frequency or interval may be variable and may be stored in the memory 314 of the device 300. In addition, if the voltage output is found to be less than the threshold voltage level, the processor 312 may cause the light source of a second illumination panel to flash red light using a second light source towards approaching traffic to catch attention of the drivers. In an example, the flashing of red light and the white light is coordinated and are flashed at a same frequency but different times.

In an example, the temperature sensor may continuously monitor an ambient temperature reading and provide feedback to the processor 312. The processor 312 may compare the ambient temperature reading with a threshold temperature. In an example, the threshold temperature is stored in the memory 314 of the device 300. If the ambient temperature reading drops below the threshold temperature, the processor 312 may send a signal to the light source of a third illumination panel to flash light towards the traffic at a periodic frequency or interval. In an example, the light source of third illumination panel may flash a blue light for indicating to the drivers that there may be possible formation of ice or snow on the roads so that the drivers can slow down the vehicle while approaching the traffic signboard placed along the roadway.

As may be appreciated, ice and snow formation on road will reduce the friction between the vehicle tires and surface of the road, and this reduction in the friction may increase the stopping distance of the vehicle. Therefore, the flashing of blue light from the light source of third illumination panel towards traffic during icy or snowy conditions serves as a warning to the vehicle driver. Hence, the vehicle driver upon noticing the blue flashing light from a greater distance may reduce the speed of the vehicle when approaching any hazardous roadway section.

In an example, when the ambient temperature reading approaches the threshold temperature or becomes greater than the threshold temperature, the temperature sensor may send feedback to the processor 312 and the processor 312 may turn off the light source of the third illumination panel. In an example, the threshold temperature is an optimum temperature required for driving. In an example, the threshold temperature is about 4° Celsius.

Further, a camera may be used for recording the traffic pattern of vehicles along with the date and time of the arrival. The camera may also be used to record the speed of approaching vehicles. In one example, the recorded data may be shared with a remote server 318 through a network 320. In another example, the camera may stream the real time video and photos to the remote server 318. The remote server 318 may be placed in a traffic management center such as a highway agency and may use the recorded data for better planning and management of road safety infrastructure.

In various implementations, the network 320 may be a wireless or a wired network, or a combination thereof. The network 320 may be a collection of individual networks, interconnected with each other and functioning as a single large network (e.g., the internet or an intranet). Examples of such individual networks include Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the communication network includes various network entities, such as transceivers, gateways, and routers.

In an example, a movement detector or traffic detector, such as a radar traffic detector or a Lidar traffic detector, may detect the traffic pattern such as average speed of the vehicle, density of traffic, etc. The density of traffic may be the number of vehicles passing through the area covered by the device 300 during an interval of time. The traffic detector may also detect the speed of vehicles on the roadway and display the speed to the drivers to make drivers aware when they are driving at speeds above posted limits. In an example, the speed of vehicle is detected based on analysis of the signals captured by the traffic detector or camera. In one example, long range movement detectors may be used in traffic detectors to trip the video camera in sufficient time to capture a vehicle travelling at high speed. As the long-range movement detectors consume less power than recording video constantly, the overall power of the device can be conserved. The traffic detectors can also stamp the video with vehicle radar speed for collecting and storing for analysis purpose. In an example, the long-range movement detectors can also send a warning to a traffic management center in case of over speeding vehicles at the intersections. In another example, a short-range movement detector in traffic detectors may be used to trip the camera for low-power-consumption still shots.

In an example, the detected speed of the vehicle may be compared with a threshold speed. If the speed increases beyond the threshold speed, the processor 312 may cause the light source of a fourth illumination panel to flash light on traffic signboard or in the direction of approaching traffic. In an example, the light source of the fourth illumination panel may flash a yellow color light for alerting the driver of over speeding. The threshold speed may be predefined, for example, based on an optimum speed for driving on the specified road as per the speed regulations and may be stored in the memory of the device.

As can be appreciated, in case two or more conditions are applicable, the processor 312 may cause the light sources of the different illumination panels 308 to flash different colored lights in series. For example, in case of speeding vehicle detected in the night during winter, a white light may flash followed by a blue light and followed by a yellow light, and this sequence may be repeated with the different light flashing at the same frequency but different time instances.

In an example, the camera may also track pedestrian activity at the pedestrian walk zone or at the area where the device is positioned. If the camera detects pedestrian activity, the camera may send a signal to the processor 312 notifying about the pedestrian activity. The processor 312 may then cause another alert to be provided, for example, by causing a fifth illumination panel to flash light towards the pedestrian walk zone or towards the traffic, to alert the drivers about the pedestrian activity. In an example, the light source of the fifth illumination panel may flash a red color light facing the traffic or on the pedestrian walk zone at a high frequency to alert the drivers so that the drivers can slow down the vehicles.

In an example, the red color light has greater visibility and the drivers can view the flashing red light even from a larger distance. It may thus provide advance warning to the drivers. In an example, a reflector tape may also be provided against the backdrop of the light source of the fifth illumination panel that helps to enhance the brightness of red color light.

It will be understood that the color of light to be flashed and the direction in which the light may be flashed may be configured by a user who controls the device 300. The colors of light mentioned in the description are merely indicative and not limiting.

In some examples, the camera may also be used to document the traffic behavior, such as collision and stop and go behavior of vehicles, for sharing with the remote server 318 over the network 320. In one example, the camera may also stream the real time video and photos to the remote server 318. The camera may also store the traffic behavior in the memory 314 of the device 300. The camera may also be used to observe details of pre-crash behavior, such as the principal direction of force, approach angle, approach velocity, vehicle damage, environmental conditions, injury patterns, etc. which helps in traffic accident research studies for preventing future crashes and fatalities.

In an example, the camera may also record the real time traffic behavior during the day and may send the data to the remote server 318 for monitoring. In another example, the camera may stream the real time video and photo to the remote server 318. The real time traffic behavior may be helpful in understanding the traffic patterns on road, before making any geometric design changes to the roadway for a safe and efficient movement of the vehicle.

Additionally, the device 300 may be equipped with an antenna to wirelessly transmit alerts in the form of notifications to the driver of vehicles. In an example, the antenna is a wireless-sending beacon. In an example, a receiving device 322 such as a cell phone, GPS receiver, car-radio with modifications etc., may be placed in the vehicle. The receiving device 322 picks-up the beacon signal from the traffic sign and alerts the driver about the hazard. In an example, the notification can be audible alert, visual alert or both. In one example, the receiving device 322 present in the vehicle can also acts as a transceiver to provide a metric to the TWDC (e.g., number of vehicles alerted). In an example, the beacon signal received from the antenna is low information in nature, thus can be sent as a short burst and/or narrow bandwidth affording long range. In an example, error correction can also be added to the beacon signal with a slight increase in overhead to enhance reliability.

In one example, the antenna is a low RF (radio frequency) power transmitting device that transmits alerts to the vehicles whose alert-distance metric is based on received signal strength indicator (RSSI). In an example, the antenna is an omni-directional whip mounted atop a housing of device. The set-up of the antenna can be adjustable affording heights sufficient to overcome terrain obstructions. In addition, the antenna could be directional such as patch arrays, yagi, circularly polarized to avoid reflective nulls, etc. In an example, a form of antenna diversity can also be achieved having the same wireless option installed on the multiple signs of intersections.

Thus, the device 300 integrates various components in a compact and simple unit that may be installed on any traffic signboard, whether at an intersection or otherwise, to efficiently monitor and regulate traffic and alert drivers, thereby enhancing road safety under various ambient conditions. By flashing lights of different colors, the device 300 can provide alerts to drivers while also conserving battery usage and catching attention of the drivers.

In one example embodiment, as discussed above, the device 300 may be a passive device, i.e., may not communicate with vehicle. In such embodiment, the device 300 flashes lights of different colors depending on the detected conditions. The flashing lights make the signboards more visible to attract attention of drivers. In another embodiment, the device 300 may be an active device, i.e., the device sends messages to the driver to onboard units and establishes communication in addition to flashing lights. With this, the signboards will become smart signs and the communication can be customized to different use case scenarios.

Figure 4:
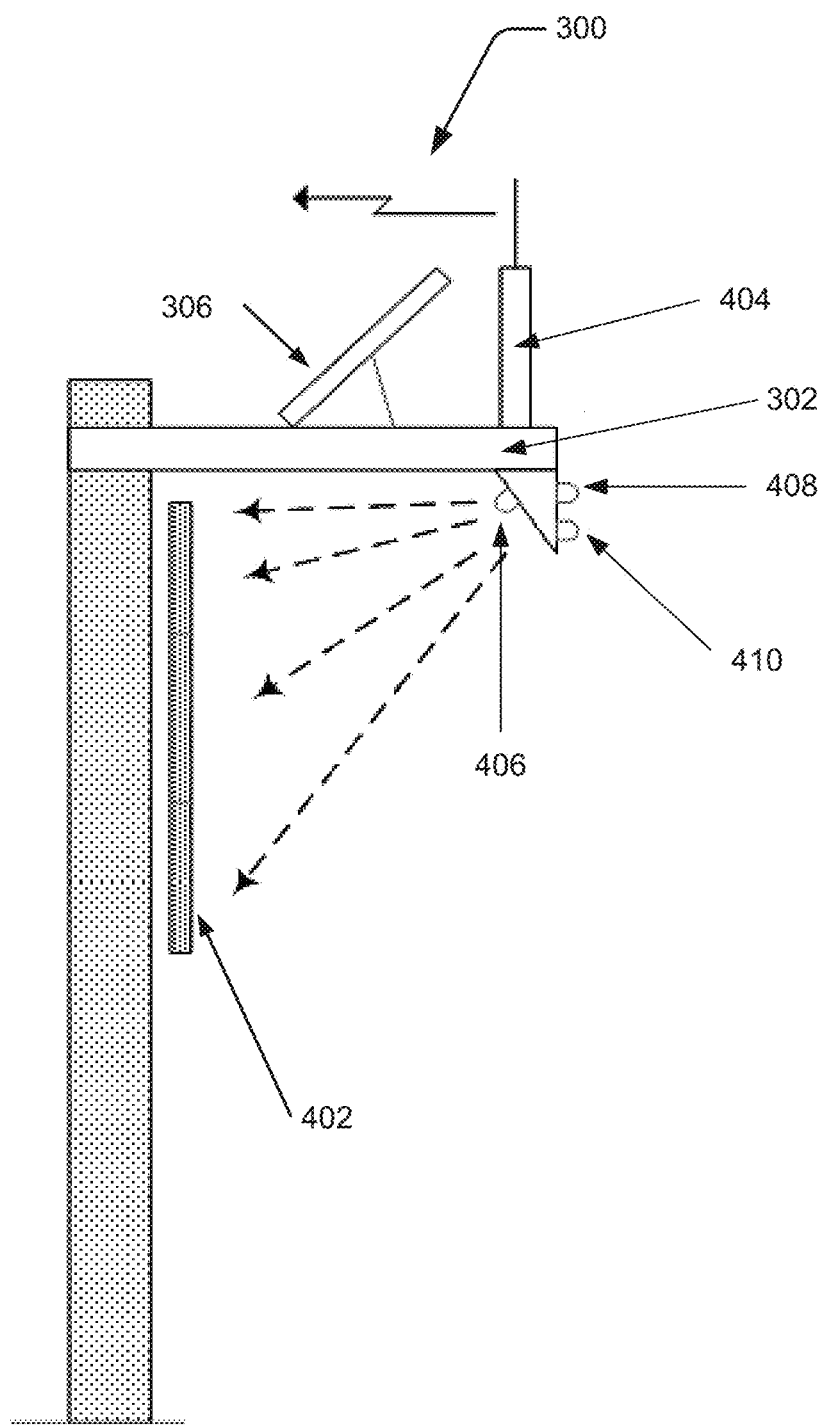
FIG. 4 illustrates a TWDC device connected to a traffic signboard in greater detail, in accordance with an example implementation of the present subject matter.

FIG. 4 illustrates a TWDC device connected to a traffic signboard in greater detail, in accordance with an example implementation of the present subject matter. In an example, the device 300 is mounted on a signpost of a signboard 402, for example, using a universal mounting bracket. Thus, the device 300 can be retro-mounted onto the traffic signboard and does not have to be integrated with it. As a result, installation, maintenance, and replacement are made easy and cost effective.

The device 300 includes the solar panel 306 and an antenna 404 mounted on a housing 302. Through the housing 302, the device 300 integrates various components into a compact and simple unit that may be installed on any signpost.

A first illumination panel 406 may be positioned to illuminate a face of the signboard 402 so that drivers can clearly view the shape, symbols, and text on the signboard 402. For example, the first illumination panel 406 may be positioned facing the signboard 402 and with a gap between the first illumination panel 406 and the signboard 402 so as to direct light onto a face of the signboard. Further, a second illumination panel 408 and a third illumination panel 410 may be positioned to flash light in the direction of approaching traffic, as discussed earlier. Similarly, other illumination panels may be positioned in different directions depending on the nature of alert to be provided. Further, one or more cameras and movement detectors (not shown) may also be positioned on the housing 302 to capture video or detect movement of approaching vehicles and/or pedestrians.

The antenna 404 may wirelessly transmit alerts in the form of notifications to the driver of vehicles. In an example, the antenna 404 is a wireless-sending beacon. In an example, a receiving device such as a cell phone, GPS receiver, car-radio with modifications etc., may be placed in the vehicle. The receiving device picks-up the beacon signal from the antenna and alerts the driver about the hazardous conditions such as icy road, pedestrian activity, etc. In an example, the notification can be audible alert, visual alert or both. In one example, the device present in the vehicle can also acts as a transceiver to provide a metric to the TWDC (e.g., number of vehicles alerted). In an example, the beacon signal received from the antenna is low information in nature, thus can be sent as a short burst and/or narrow bandwidth affording long range. In an example, error correction can also be added to the beacon signal with a slight increase in overhead to enhance reliability.

In one example, the antenna 404 is a low RF (radio frequency) power transmitting device that transmits alerts to the vehicles whose alert-distance metric is based on received signal strength index (RSSI). In such scenarios, the RF transmitted signal would be low-enough to not transmit farther than the range needed to properly alert the driver. In this approach, as the sign and terrain are roughly fixed, at installation of antenna on the device, the RF transmitted signal could be adjusted to obtain a certain minimum RSSI trip level at the needed trip distance. In one example, any distance closer to the traffic sign would cause a higher RSSI and alert the driver. In another example, the distance that yield less RSSI do not alert the driver. In an example, the received RF signal strength varies with terrain and obstructions between antenna and receiving device of vehicle.

In the FIG. 4, the antenna 404 is shown as an omni-directional whip mounted atop a base of device. The set-up can be adjustable affording heights sufficient to overcome terrain obstructions. In addition, the antenna 404 could be directional such as patch arrays, yagi, circularly polarized to avoid reflective nulls, etc. In an example, a form of antenna diversity can also be achieved having the same wireless option installed on the multiple signs of intersections.

Thus, the drivers can be alerted by the device 300 by flashing light sources of various colors indicating different conditions, such as a pedestrian activity, over speeding, temperature, low visibility, etc. Further, the drivers can be wirelessly alerted about the hazardous road conditions using the antenna.

Figure 5A:
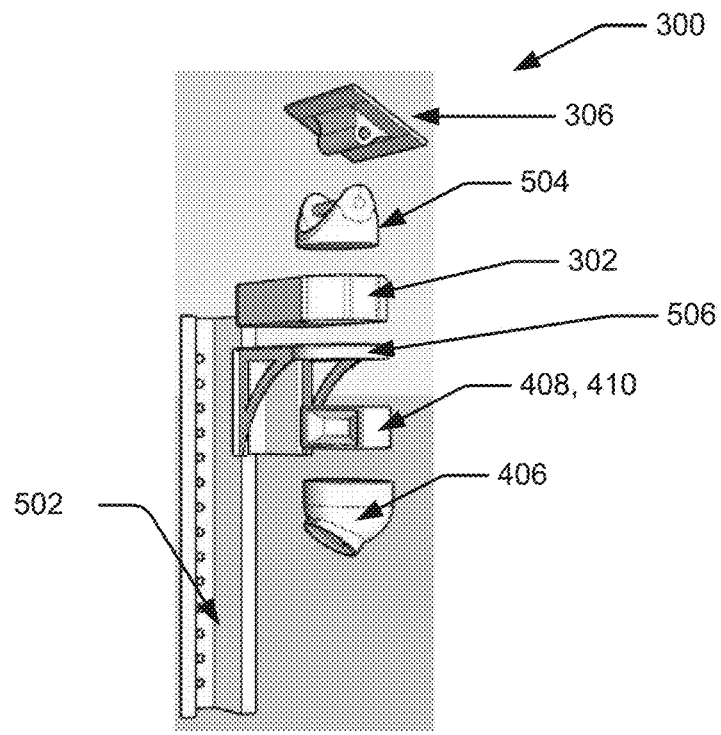
FIGS. 5a and 5b illustrate detailed views of mounting of the device using a universal mounting bracket, in accordance with an example implementation of the present subject matter.
Figure 5B:
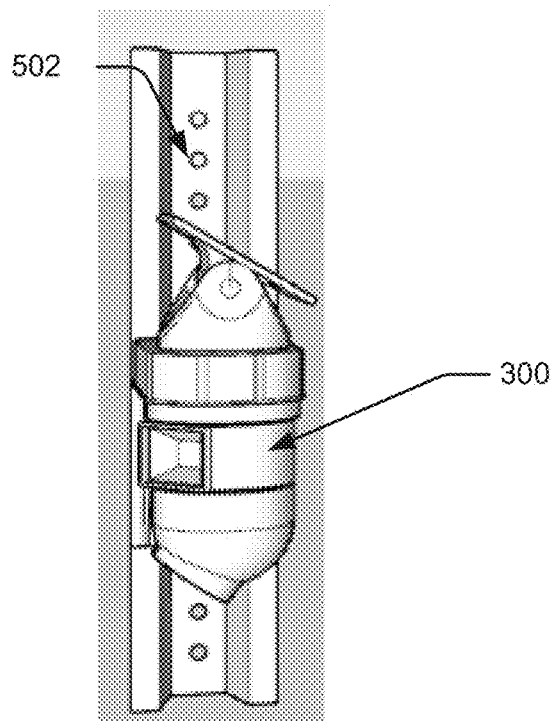

FIGS. 5a and 5b illustrate detailed views of mounting of the device 300 using a universal mounting bracket, in accordance with an example implementation of the present subject matter. The example device 300 includes the solar panel 306 mounted on the housing 302 using a solar panel bracket 504. Further, the device 300 includes a first illumination panel 406 and a second illumination panel 408 attached to a post attachment unit 506. As shown in FIG. 5a, the device 300 is mounted on a post of a traffic signboard using a universal mounting bracket 502. Thus, the device 300 can be retro-mounted onto the traffic signboard and does not have to be integrated with it. As a result, installation, maintenance, and replacement are made easy and cost effective. FIG. 5b illustrates TWDC device 300 attached to a universal mounting bracket 502, in accordance with an example implementation of the present subject matter.

Figure 6:
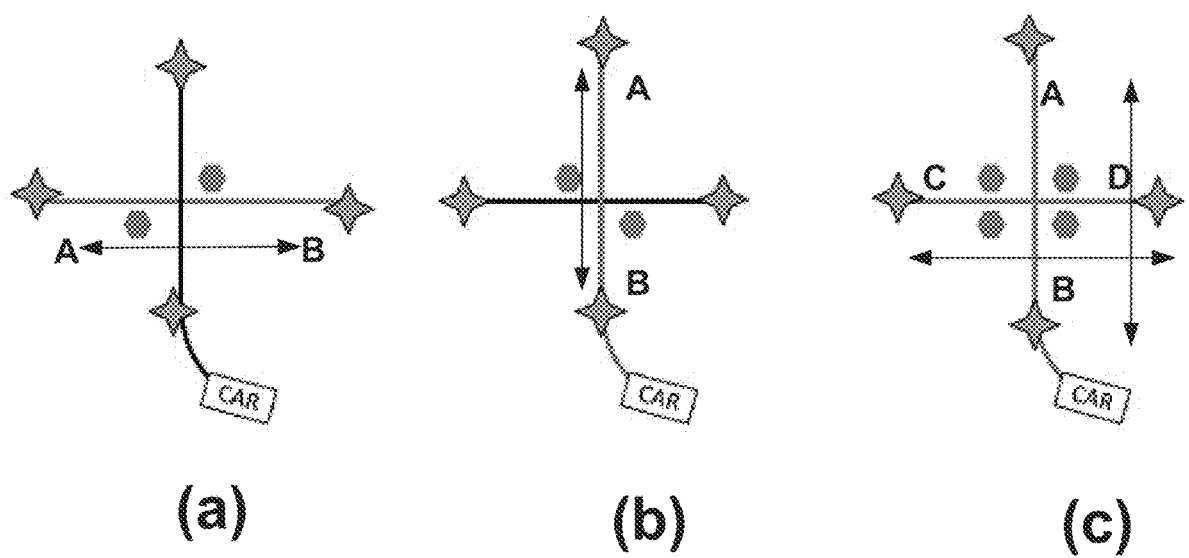
FIG. 6 illustrates an example scenario where a driver is alerted based on Global positioning system (GPS) coordinates, in accordance with an example implementation of the present subject matter.

FIG. 6 illustrates an example scenario where the driver is alerted based on Global positioning system (GPS) coordinates, in accordance with an example implementation of the present subject matter. FIGS. 6a and 6b illustrate two stop-traffic sign intersection, where the stop traffic signs are for vehicles travelling from road A to B and vice versa. In an example four GPS trip coordinates are programmed into one or more beacons at the intersection traffic sign.

In an example, a driver approaching the intersection receives a message "need to alert" GPS trip location (data) from the intersection beacons on a receiving device of the vehicle. The message is ideally received ahead of the vehicle reaching the location. In a short time traveling, the receiving device such as the GPS receiver may match the GPS location data of the trip coordinates and thus indicate an alert for the upcoming intersection. In an example, the matching need not be exact, it could include a small delta of the exact location. Alternately, the driver is alerted in various fashions, or in case if the first alert is missed, the driver is alerted anywhere between two GPS trip locations. In an example, the alert can be one time or continuous. In an example, the continuous alert depends upon whether the driver crossed the secondary trip location set as an "off" for the alert. In a continuous alert, the signal to "turn-off" the alert could be crossing any of the other three "trip" spots. (i.e., driver went through the intersection or turned right or left.).

As shown in the FIG. 6a, the stop signs may be on the road A-B and the car receives a message "approaching dangerous intersection" when it reaches the GPS trip location as the road on which the car is travelling on does not have stop signs. Further, as shown in the FIG. 6b, the car approaching intersection receives a message "approaching stop traffic signal" as in this case the road on which the car is travelling includes a stop sign at the intersection. Therefore, the car receives a warning message ahead of reaching the intersection with stop sign. In an example, the warning message may be an audible alert or visual alert for e.g. a message "warning, dangerous intersection approaching stop sign ahead in X feet" may be displayed on the receiving device of the vehicle. FIG. 6c illustrate a four stop-traffic sign intersection, where the stop signs are present on both the roads A to B and C to D. In an example, when the car approaches the intersection, the receiving device of car receives a message "approaching stop" ahead of reaching the intersection with stop sign.

In some implementations, the beacons may be paired to indicate to the driver when an intersection is being approached and when the intersection has been crossed. In one example, as shown in FIGS. 6a and 6b, there may be one paired signal, while in another example shown in FIG. 6c, there may be two paired signals on the intersection.

Figure 7:
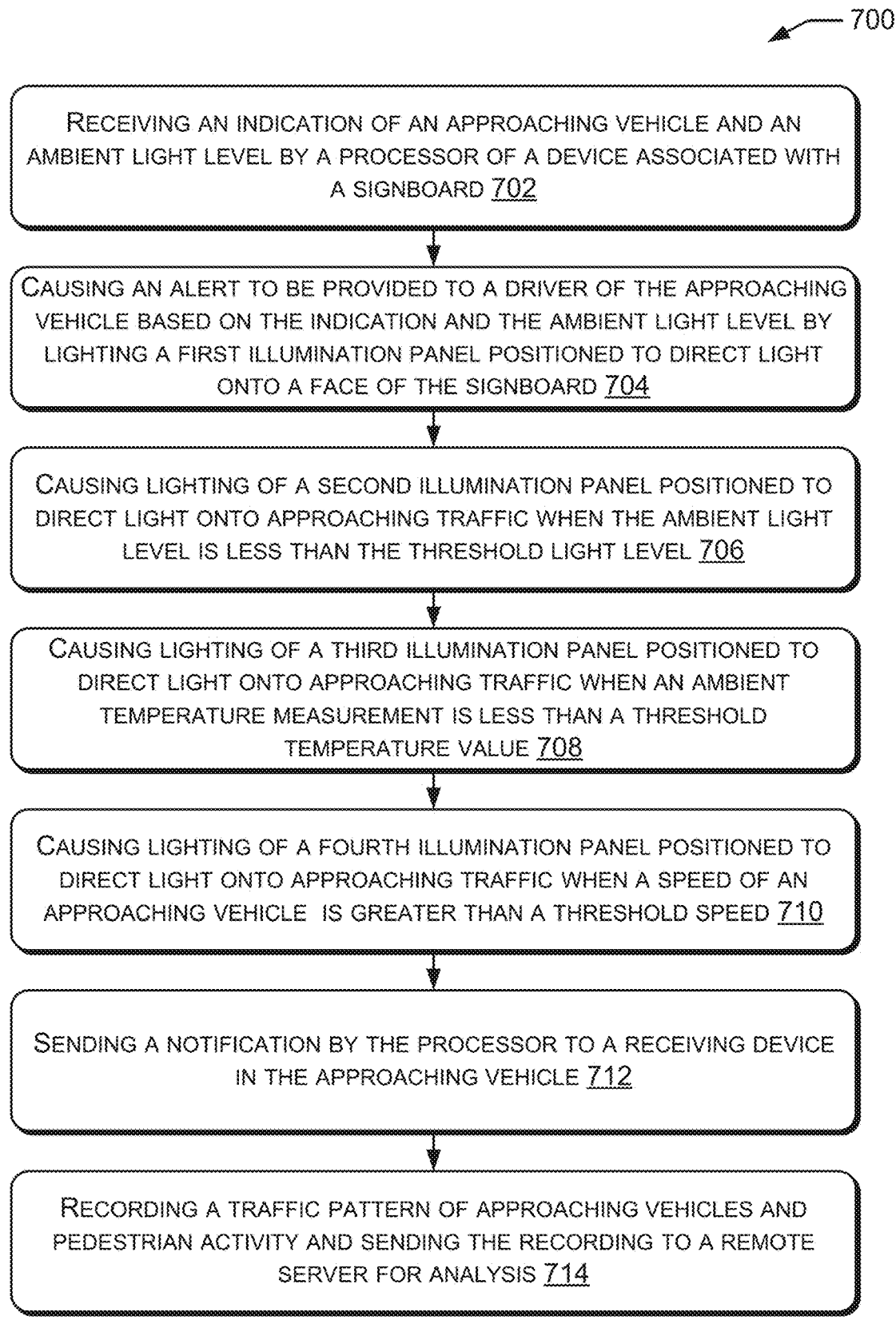
FIG. 7 illustrates a method of alerting drivers by a TWDC device, in accordance with an example implementation of the present subject matter.

FIG. 7 illustrates a method of alerting drivers by integrated traffic warning and data capture devices, in accordance with an example implementation of the present subject matter. The order in which the method 700 is described is not intended to be construed as a limitation, and some of the described method blocks can be combined in a different order to implement the methods or alternative methods.

Furthermore, the method 700 may be implemented in any suitable hardware, computer-readable instructions, or combination thereof.

The steps of the method 700 may be performed by either a system under the instruction of machine-executable instructions stored on a non-transitory computer-readable medium or by dedicated hardware circuits, microcontrollers, or logic circuits. Herein, some examples are also intended to cover non-transitory computer-readable medium, for example, digital data storage media, which are computer-readable and encode computer-executable instructions, where the instructions perform some or all of the steps of the method 700. While the method 700 may be implemented in any device, the following description is provided in the context of a device 300 as described earlier with reference to FIGS. 3-6 for ease of discussion.

Referring to method 700, at block 702, at least one of an indication of an approaching vehicle and an ambient light level may be received by a processor of a device associated with a signboard. For example, the processor may receive the indication of the approaching vehicle from a camera or movement detector and may receive the ambient light level from a solar panel connected to the processor or from a light sensor.

At block 704, the processor may cause an alert to be provided to a driver of the approaching vehicle based on the indication and/or the ambient light level. The alert may be provided by lighting a first illumination panel positioned to direct light onto a face of the signboard. In one example, the first illumination panel includes LEDs that give out white light, which is directed onto the face of the signboard for better visibility. The illumination may be provided as a flashing white light to conserve power and attract attention of a driver of the approaching vehicle. The alert may be provided when the ambient light level is less than a threshold light level or when the approaching vehicle is detected or both.

At block 706, the processor causes lighting of a second illumination panel positioned to direct light onto approaching traffic when the ambient light level is less than the threshold light level. In one example, the second illumination panel includes LEDs that give out red light, which is directed onto the approaching traffic for catching the attention of the driver.

At block 708, the processor causes lighting of a third illumination panel positioned to direct light onto approaching traffic when an ambient temperature measurement is less than a threshold temperature value. The processor may receive the ambient temperature measurement from a temperature sensor. In one example, the third illumination panel includes LEDs that give out blue light, which is directed onto the approaching traffic for catching the attention of the driver.

At block 710, the processor causes lighting of a fourth illumination panel positioned to direct light onto the approaching traffic when a speed of the approaching vehicle is greater than a threshold speed. In an example, the threshold speed may be predefined, for example, based on an optimum speed for driving and may be stored in the memory of the device. The processor may receive the speed of the approaching vehicle from a speed detector. In one example, the fourth illumination panel includes LEDs that give out yellow light, which is directed onto the approaching traffic for catching the attention of the driver.

Thus, the device of the present subject matter can alert the driver about different hazardous driving conditions by causing one or more illumination panels to flash lights of different colors for alerting a driver of the approaching vehicle of different hazardous driving conditions. In one example, lights of different colors are flashed at different instances. For example, in case a vehicle approaches a stop signboard during night time when the temperatures are less than the threshold temperature, the device may cause a series of lights to flash starting with white light flashing on the face of the stop signboard, followed by a red light flashing in the direction of the approaching vehicle, followed by a blue light flashing in the direction of the approaching vehicle. The series of flashing lights may be provided till the driver crosses the stop signboard. It will be understood that the lights may be flashed in a different sequence as well and the series discussed above is only an example.

Further, at block 712, a notification is sent by the processor to a receiving device in the approaching vehicle. The notification is to cause the receiving device to generate an audio alert or a visual alert or both to alert the driver. The notification may be sent as a wireless beacon and may include encoded information indicative of one or more of an intersection, the signboard, hazardous driving conditions, pedestrian activity information, GPS coordinates of recommended braking points, and road information. In one example, a received signal strength indicator (RSSI) may be received from the receiving device and the notification may be transmitted to the receiving device when the RSSI is greater than a threshold RSSI.

At block 714, a traffic pattern of approaching vehicles and pedestrian activity is recorded using a video camera. In one example, the recording is sent to a remote server for analysis. In another example, the recording is sent to the driver of approaching vehicle to alert them. The recording may be initiated based on one or more of detection of the approaching vehicle, a movement detector, and a speed detector.

The present subject matter thus integrates all the components as discussed above into a single TWDC device that may be installed on any traffic signboard. The device helps in enhancing the visibility of traffic signboards at signalized intersections, unsignalized intersections, and along the roadway during the low visibility situations by flashing light at a periodic interval on the signboards and by sending alerts in the form of notifications to the driver.

The present subject matter also helps in alerting drivers about temperature-related dangerous road conditions, such as the formation of ice or snow on roads. Further, the drivers can be alerted by flashing LED light of various colors indicating different conditions, such as a pedestrian activity, over speeding, temperature, etc., so that the drivers can vary the speed of the vehicle appropriately. The present subject matter additionally monitors the real-time traffic pattern that helps traffic engineers for improving roadway geometrics. Thus, the device helps in improving overall road safety. Further, the device is energy efficient as it uses solar panels as a source of energy and therefore has low maintenance.

The preceding description has been presented to illustrate and describe examples of the principles described. This description is not intended to be exhaustive. Many modifications and variations are possible in light of the above teaching.

What is claimed is:

1. A method comprising:
   receiving, by a processor of a device associated with a signboard, an indication of an approaching vehicle, an ambient light level, and a temperature-related road condition;
   in response to the indication of the approaching vehicle, the ambient light level, and the temperature-related road condition indicating a hazardous driving condition, generating, by the processor, a plurality of alerts for warning the approaching vehicle of the hazardous driving condition by illuminating one or more illumination panels with lights of different colors; and sending a notification as a wireless signal beacon to a receiving device in the approaching vehicle, wherein the notification is to cause the receiving device to generate an audio alert or a visual alert or both, wherein the notification comprises encoded information indicative of global positioning system (GPS) coordinates of recommended braking points.

2. The method of claim 1, comprising causing, by the processor, the alert to be provided when the ambient light level is less than a threshold light level or when the approaching vehicle is detected or both.

3. The method of claim 2, comprising further causing, by the processor, lighting of a second illumination panel positioned to direct light onto approaching traffic when the ambient light level is less than the threshold light level.

4. The method of claim 1 comprising:
receiving, by the processor, an ambient temperature measurement; and
causing, by the processor, lighting of a third illumination panel positioned to direct light onto approaching traffic when the ambient temperature measurement is less than a threshold temperature value.

5. The method of claim 1, wherein the notification further comprises encoded information indicative of one or more of an intersection, the signboard, hazardous driving conditions, pedestrian activity information, and road information.

6. The method of claim 5, comprising detecting a received signal strength indicator (RSSI) from the receiving device and transmitting the notification when the RSSI is greater than a threshold RSSI level.

7. The method of claim 1, comprising:
determining, by the processor, a speed of the approaching vehicle; and
causing, by the processor, lighting of a fourth illumination panel positioned to direct light onto the approaching traffic when the speed of the approaching vehicle is greater than a threshold speed.

8. The method of claim 1, wherein the processor is to cause one or more illumination panels to flash lights of different colors for alerting a driver of the approaching vehicle of different hazardous driving conditions, wherein lights of different colors are flashed at different instances.

9. The method of claim 1 comprising recording a traffic pattern of approaching vehicles and pedestrian activity using a video camera and sending the recording to a remote server for analysis, wherein the recording is initiated based on one or more of detection of the approaching vehicle, a movement detector, and a speed detector.

10. A device for integrated traffic warning and data capture, wherein the device comprises:
a housing to be mounted on a signpost having a signboard mounted thereon;
a power system comprising a power source mounted on the housing to provide electricity for operation of the device;
one or more illumination panels mounted on the housing to direct light in particular directions;
one or more sensor devices attached to the housing;
an antenna; and
a processor housed in the housing and electrically connected to the power system, the one more illumination panels, and the one or more sensor devices, wherein the processor is to:
receive an indication of an approaching vehicle from a traffic sensor, an ambient light level, and a temperature-related road condition;
in response to the indication of the approaching vehicle, the ambient light level, and the temperature-related road condition indicating a hazardous driving condition, generate a plurality of alerts for warning the approaching vehicle of the hazardous driving condition by illuminating one or more illumination panels with lights of different colors; and
cause a notification to be sent by the antenna as a wireless signal beacon to a receiving device in the approaching vehicle, wherein the notification is to cause the receiving device to generate an audio alert or a visual alert or both, wherein the notification comprises encoded information indicative of global positioning system (GPS) coordinates of recommended braking points.

11. The device of claim 10, wherein the processor is to cause the alert to be provided when the ambient light level is less than a threshold light level or when the approaching vehicle is detected or both.

12. The device of claim 11, wherein the processor is to cause lighting of a second illumination panel positioned to direct light of a second color onto approaching traffic when the ambient light level is less than the threshold light level.

13. The device of claim 10, wherein the power source is a solar panel.

14. The device of claim 10, wherein the processor is to
receive an ambient temperature measurement from a temperature sensor; and
cause lighting of a third illumination panel positioned to direct light of a third color onto approaching traffic when the ambient temperature measurement is less than a threshold temperature value.

15. The device of claim 14, wherein the processor is to a received signal strength indicator (RSSI) from the receiving device and cause the notification to be transmitted when the RSSI is greater than a threshold RSSI level.

16. The device of claim 10, wherein the notification further comprises encoded information indicative of one or more of an intersection, the signboard, hazardous driving conditions, pedestrian activity information, and road information.

17. The device of claim 10, wherein the processor is to determine a speed of the approaching vehicle; and
cause lighting of a fourth illumination panel positioned to direct light of a fourth color onto the approaching traffic when the speed of the approaching vehicle is greater than a threshold speed.

18. The device of claim 10, wherein the processor is to cause the one or more illumination panels to flash lights in different colors for alerting a driver of the approaching vehicle of different hazardous driving conditions, wherein the lights of different colors are flashed at different instances and in one more directions.

19. The device of claim 10, comprising one or more brackets for mounting the device on the signpost, wherein the one or more brackets are to allow adjustment of a height at which the device is mounted and directions in which the one or more illumination panels and the one or more sensing devices are positioned.

* * * * *